(12) United States Patent
Berlatzky et al.

(10) Patent No.: US 9,664,907 B2
(45) Date of Patent: May 30, 2017

(54) OPTICAL ELEMENT FOR SPATIAL BEAM SHAPING

(71) Applicant: APPLIED MATERIALS ISRAEL, LTD., Rehovot (IL)

(72) Inventors: Yoav Berlatzky, Kibbutz Beit Guvrin (IL); Seffi Sadeh, Netanya (IL); Ido Kofler, Givataim (IL); Haim Eder, Kiryat Ono (IL); Michael Rudman, Jerusalem (IL); Hagay Famini, Moshav Ptachia (IL)

(73) Assignee: Applied Materials Israel Ltd., Rehovot (IL)

( * ) Notice: Subject to any disclaimer, the term of this patent is extended or adjusted under 35 U.S.C. 154(b) by 381 days.

(21) Appl. No.: 14/336,862

(22) Filed: Jul. 21, 2014

(65) Prior Publication Data

US 2016/0018660 A1    Jan. 21, 2016

(51) Int. Cl.
| | |
|---|---|
| *G02B 27/09* | (2006.01) |
| *H01L 27/146* | (2006.01) |
| *G02B 21/06* | (2006.01) |
| *G02B 5/20* | (2006.01) |
| *G02B 27/14* | (2006.01) |

(52) U.S. Cl.
CPC ......... *G02B 27/0905* (2013.01); *G02B 5/201* (2013.01); *G02B 21/06* (2013.01); *G02B 27/143* (2013.01)

(58) Field of Classification Search
CPC .............. G02B 27/0905; G02B 27/143; G02B 27/0977; G02B 5/201; G02B 21/06; G02B 27/09; H01L 27/14625; H01L 27/146

See application file for complete search history.

(56) References Cited

U.S. PATENT DOCUMENTS

| | | | | |
|---|---|---|---|---|
| 4,928,008 A * | 5/1990 | Huggins | .................. | G01D 5/34 250/214 PR |
| 5,576,830 A * | 11/1996 | O'Brien | ................. | G02B 5/205 250/231.1 |
| 6,545,265 B1 * | 4/2003 | Czarnetzki | ......... | G02B 21/0044 250/234 |
| 7,608,813 B1 * | 10/2009 | Milvich | ............. | G01D 5/34784 250/231.13 |
| 7,815,966 B2 * | 10/2010 | Miyazaki | ............... | B41M 3/006 427/164 |
| 7,924,517 B2 * | 4/2011 | Ambar | ................... | G02B 27/46 359/891 |

(Continued)

*Primary Examiner* — John Lee
(74) *Attorney, Agent, or Firm* — Kilpatrick Townsend & Stockton LLP (57) ABSTRACT

A spatial beam shaper structure and a corresponding optical system are provided. The spatial beam shaper structure comprises a light collecting surface configured for affecting light impinging thereon to provide a substantially smooth light profile of at least one optical property, the light collecting surface having a pattern in the form of multiple surface regions comprising regions of at least two different optical properties arranged in an alternating fashion, wherein an interface region between each two locally adjacent regions of the different optical properties has the at least two different optical properties, to provide substantially smooth transition of said different optical properties within the interface region.

12 Claims, 6 Drawing Sheets

(56) References Cited

U.S. PATENT DOCUMENTS

| | | | | |
|---|---|---|---|---|
| 8,309,906 B2* | 11/2012 | Kapner | G01D 5/24476 | 250/231.16 |
| 8,984,453 B2* | 3/2015 | Mangan | G03F 1/84 | 430/30 |
| 9,403,300 B2* | 8/2016 | Kolb | B29C 41/24 | |
| 2003/0058433 A1* | 3/2003 | Almogy | G01N 21/9501 | 356/237.1 |
| 2004/0021758 A1* | 2/2004 | Miyazaki | B41M 3/006 | 347/106 |
| 2011/0210094 A1* | 9/2011 | Gray | G01N 21/6428 | 216/12 |
| 2012/0075887 A1* | 3/2012 | Parker | F21V 5/00 | 362/612 |
| 2012/0281415 A1* | 11/2012 | Bornhorst | G02B 26/00 | 362/293 |
| 2013/0038926 A1* | 2/2013 | Soer | G02B 5/208 | 359/350 |
| 2013/0039094 A1* | 2/2013 | Kolb | B29C 41/24 | 362/618 |
| 2013/0070320 A1* | 3/2013 | Holmes | G02B 5/32 | 359/9 |
| 2015/0003106 A1* | 1/2015 | Thompson | G02B 6/0035 | 362/607 |
| 2015/0036377 A1* | 2/2015 | Tininenko | G02B 6/0008 | 362/551 |
| 2015/0070741 A1* | 3/2015 | Bowron | G03B 9/02 | 359/223.1 |
| 2015/0205034 A1* | 7/2015 | Facke | G02B 6/0035 | 362/606 |
| 2015/0208144 A1* | 7/2015 | Holmes | H04J 14/02 | 398/48 |
| 2015/0370071 A1* | 12/2015 | Alton | G02B 27/0172 | 349/11 |
| 2016/0018660 A1* | 1/2016 | Berlatzky | G02B 27/0905 | 250/227.28 |
| 2016/0077261 A1* | 3/2016 | Arbabi | G02B 5/3025 | 359/493.01 |

* cited by examiner

OPTICAL ELEMENT FOR SPATIAL BEAM SHAPING

FIELD OF THE INVENTION

This invention is generally in the field of light directing optics, and relates to an optical element for spatial beam shaping. The invention is particularly useful for splitting collected light between different optical channels, which might be used in scanning optical microscopes.

BACKGROUND OF THE INVENTION

Beam splitters are some of the basic optical elements and are used in various optical assemblies for spatial beam shaping. A typical beam splitter is used to divide a single optical beam into two beams to propagate along different optical paths.

Beam splitters are typically used to separate collected illumination between multiple light detection channels associated with multiple detectors, as well as spatially separating illumination and detection channels. Multiple detectors might be useful in scanning optical microscopy. The latter is typically based on inspecting/imaging a sample by illuminating successive regions on the sample, using one or more illuminating spots. It is often the case that such scanning optics is used with an array of detectors, rather than using a single movable detector.

BRIEF SUMMARY OF THE INVENTION

There is a need in the art for a novel technique enabling detection of spatially separated light components by an array (at least two) of spaced-apart light sensitive regions. This technique allows for providing a continuous detection region formed by the array of discrete light sensitive regions, while avoiding losses associated with existing physical spaces (so-called "dead regions") between the discrete light sensitive regions.

In order to increase detection efficiency, e.g. by reducing dead regions between locally adjacent discrete light sensitive regions (e.g. separate photodiodes) in the detector array, an additional similar detector array can be used, in combination with a beam splitter. The beam splitter splits input light (collected light from a sample) into first and second spatially separated light components and directs them along first and second optical paths towards the first and second detector arrays respectively. The first and second detector arrays are accommodated such that light sensitive regions of one detector array are exposed to a part of split light components while the other part of said split light components propagates and impinges onto the dead regions of the other detector array. Thus, the use of a beam splitter which divides collected light between two detector arrays enables reducing the effect of dead regions between the detectors of each array. However, a conventional beam splitter divides the intensity of the collected light into two halves and directs them in different directions. Such light splitting results in that only 50% of the collected intensity reaches each detector and thus reduces the efficiency of light detection.

The invention is useful for the above described splitting of collected light between two detector arrays (arrays of discrete light sensitive regions). The invention provides novel optical element configured as a spatial beam shaper, which while splitting and directing the input light along different optical paths, eliminates or at least significantly reduces loses associated with such splitting.

To this end, the optical element of the invention has a light collection surface, which is configured with a predetermined pattern. The pattern includes regions applying two or more different optical effects to the light components incident on said surface, while providing substantially smooth and continuous transition between respective regions and accordingly between the different effects on said light components. Such different optical effects include those affecting the light propagation direction, as well as attenuation, wavelength and/or polarization properties of the light. According to one specific example, the optical element of the present invention is capable of spatially separating incident illumination into different light components propagating along different optical paths such that light incident on predetermined location(s) of the light collection surface of the optical element is directed towards one light propagation channel, while light incident on other predetermined location(s) of said surface is directed to another light propagation channel.

The pattern in the optical element includes features of different optical properties, e.g. variation of light transmission along the optical element, arranged in an alternating fashion. In the specific example of spatial separation of light components, the pattern in the optical element may be in the form of alternating relatively reflective and transmitting regions, where each two locally adjacent reflective and transmitting regions interface one another by a boundary zone (interface region) having both transmitting and reflective properties. Thus, light passage through the patterned optical element results in that the variation of light transmission along the optical element provides substantially continuous/smooth light profile with respect to at least one of said optical properties. Generally, the optical element induces variation of light properties of the light interacting with the optical elements, while this variation is continuous for each of the different properties. In the specific example of spatial splitting or spatial beam shaping with respect to light intensity, the pattern in the optical element is designed to provide substantially continuous intensity profile along each of the optical paths. In the case of directing different light components onto different optical channels, the optical element provides for eliminating, or at least substantially reducing, border effect and losses in the transition regions between the channels.

Thus, the optical element of the invention includes a light collection surface comprising a plurality of regions of different optical properties (e.g. reflecting and transmitting regions or regions having different refractive indices) arranged in an interlaced/alternating order within the light collecting surface. Considering the above example of transmitting and reflective regions, light incident on one region of the optical element is transmitted through said region and is thus directed towards one channel, while light incident on the adjacent region is reflected towards another optical channel.

The optical element of the present invention is thus configured as a spatial beam shaper and is particularly useful in scanning imaging systems (e.g. scanning optical microscope), and will be described below with respect to this specific application. It should however be noted that the optical element of the present invention may be used in any type of optical system and the invention is therefore not limited to any specific use of such optical element.

Thus, according to one broad aspect of the invention, there is provided a spatial beam shaper structure comprising a light collecting surface comprising a pattern in the form of multiple surface regions comprising regions of two different optical properties arranged in an alternating fashion, wherein an interface region between each two adjacent regions of the different optical properties has both of said two different optical properties, said light collecting surface thereby affecting light impinging thereon to provide a substantially continuous light profile of at least one of said optical properties.

It should be understood that such a continuous profile actually corresponds to a high smoothness of the respective optical property along the interface region.

According to another broad aspect of the invention, there is provided an optical detection unit for use in an imaging system. The detection unit comprises two detector arrays each in the form of an array of spaced-apart light sensitive surfaces; and the above described spatial beam shaper structure in the optical path of light propagating towards the detector arrays. The detector arrays are arranged such that light sensitive regions of one detector array are aligned with spaces between the light sensitive regions of the other detector array with certain overlap regions between corresponding light sensitive regions of the two detector arrays. The spatial beam shaper is configured such that the interface region between the locally adjacent regions of different optical properties has geometry and shape of an image of the overlap region. The spatial beam shaper is configured for directing first light components, collected by the array of regions of one optical property, onto the light sensitive regions of one detector array, and directing second light components, collected by the regions of the other optical property, to the light sensitive regions of the other detector array.

Thus, according to yet another broad aspect of the present invention, there is provided a spatial beam shaper structure which comprises a light collecting surface having a pattern in the form of multiple regions, the pattern comprising regions of two different optical properties arranged in an alternating fashion, wherein an interface region between each two adjacent regions of the different optical properties has both of said two different optical properties, said light collecting surface thereby affecting light impinging thereon to provide a substantially continuous light profile of at least one of said optical properties.

The regions of different optical properties may be characterized by different transmission and/or reflection of light of a certain wavelength range. According to some embodiments the regions of different optical properties may be substantially reflecting and transmitting regions for said wavelength range.

The interface region may be patterned to provide continuous/smooth transition of the optical property. Said transition may define a transition gradient between the different optical properties. Additionally or alternatively, the pattern may be configured to define a zigzag-like transition line between the regions of different optical properties. According to some embodiments, a feature of said pattern within the interface region may have predetermined geometry and shape selected in accordance with a parameter of a light sensitive surface of a detection unit. Such predetermined geometry and shape may preferably be configured for directing light beams in an alternating fashion between at least two light paths, while gradually switching from one light path to another.

According to some embodiments, the pattern may be in the form of multiple regions of certain material printed on the light collecting surface of a different material. It should be noted that the pattern may be provided on the spatial beam shaper by various technique providing variation in color, material with or without voids e.g. slots or holes in a reflective material, diffusive areas with different graded index, and various other techniques. It should also be noted that the spatial beam shaper of the present invention is not limited to one or other patterning technique.

According to a further broad aspect of the invention, there is provided an optical detection unit for use in an imaging system, comprising two detector arrays each in the form of an array of spaced-apart light sensitive surfaces; and the spatial beam shaper structure as defined above located in optical path of light propagating towards the detector arrays, wherein the detector arrays are arranged such that light sensitive regions of one detector array are aligned with spaces between the light sensitive regions of the other detector array with certain overlap regions between corresponding light sensitive regions of the two detector arrays, said spatial beam shaper is configured for directing first light components, collected by the regions of one optical property, to the light sensitive regions of one detector array, and directing second light components, collected by the regions of the other optical property, to the light sensitive regions of the other detector array, said interface region being configured as an image of the overlap region in the detector arrays.

According to an embodiment of the invention there is provided a method for use in detection of light, the method comprising detecting light by discrete spaced-apart detection regions, the method being characterized by minimizing energy losses due to the spaces between the detection regions, the method comprising: applying spatial splitting of light to be detected into first and second light portions, said splitting comprising interacting the light to be detected with a pattern of alternating regions of different transmission and reflection properties for transmitting spaced-apart light components of the first light portion towards a first array of said spaced-apart detection regions and reflecting spaced-apart light components of the second light portion towards the second array of said spaced-apart detection regions, while providing gradual variation of the transmission and reflection properties within an interface region between locally adjacent regions of the different transmission and reflection properties.

According to an embodiment of the invention, the providing gradual variation comprises patterning said interface region to provide smooth transition of the at least one optical property, and wherein said transition defines a transition gradient between the different optical properties. According to another embodiment of the invention, the patterning comprises configuring a feature of the pattern with predetermined geometry and shape selected in accordance with a parameter of at least one of said first array of said spaced-apart detection regions and second array of said spaced-apart detection regions. According to yet another embodiment of the invention, the patterning comprises printing multiple spaced-apart regions of reflection properties on a surface having transmission properties.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF THE INVENTION

The present invention provides a novel optical element configured as a spatial beam shaper for splitting light components by applying thereto different optical effects while enabling substantially continuous and smooth transition between these different effects.

Figure 1A:
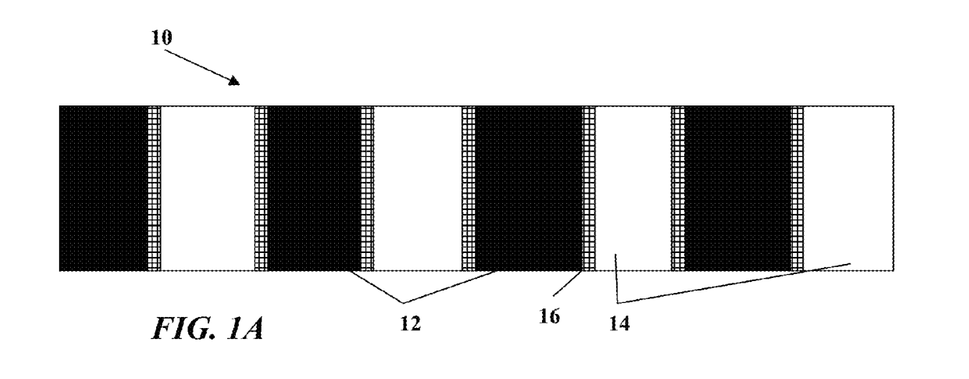
FIGS. 1A to 1C illustrate three examples of optical elements according to embodiments of the present invention.
Figure 1B:
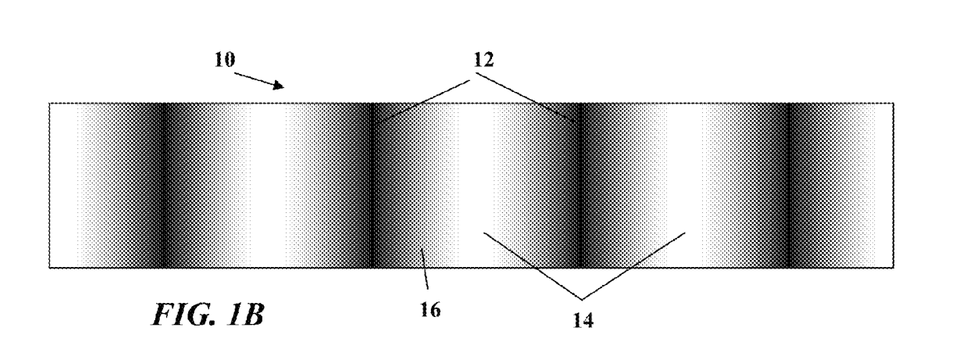
Figure 1C:
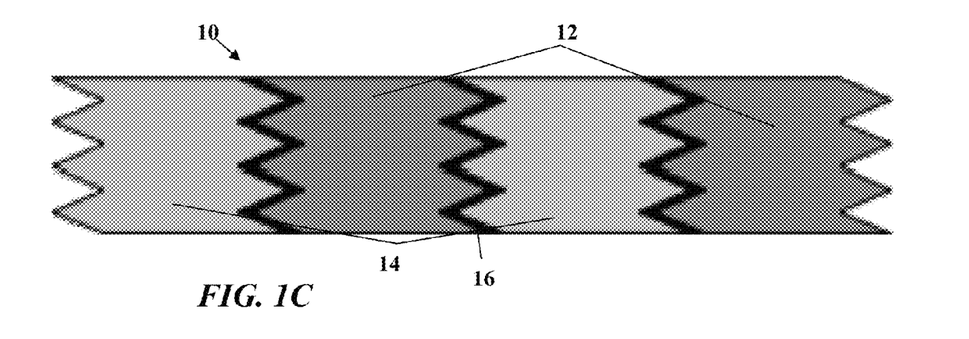

Reference is made to FIGS. 1A to 1C schematically illustrating three examples of the optical element of the present invention. To facilitate understanding, the same reference numbers are used for identifying components that are common in all the examples. Generally, the optical element has a pattern in the form of regions of at least two different optical properties arranged in an alternating fashion, and is configured such that an interface region (boundary zone) between each two adjacent regions of the different optical properties has both of said two different optical properties. This provides for affecting light impinging on the optical element so as to split it into two or more spatially separated components while providing a substantially continuous light profile of at least one of the optical properties in at least one of the split components. By this, losses associated with splitting of light towards spaced detection regions are practically eliminated.

FIG. 1A illustrates an optical elements 10 including a pattern formed by an array of regions including regions of different optical properties, fours such regions 12 of a first optical property and four regions 14 of a second optical property being shown in the present not limiting example. For example, the different optical properties are presented by different transmission of light, e.g. light of a specific spectral range. More specifically, regions 12 are reflective and regions 14 are transmitting. Generally, the regions 12 and 14 may or may not be of the same geometry and/or size. The incident light interaction with the regions 12 and 14 would split this light into multiple light components which would propagate along different (spatially separated) optical paths. It should be understood that alternatively or additionally, the pattern in the optical element may apply other effects on light interacting therewith to split this light into components having different wavelengths and/or different polarizations. Thus, typically, the optical element of the present invention includes two groups or regions having two different optical properties, respectively. However, it should be noted that three groups of regions having three different optical properties or generally any number of groups may be used.

According to the invention, interface regions, generally at 16, are provided between each two adjacent regions 12 and 14 (or between at least some of such adjacent regions), where each interface region 16 is configured to have both of the optical properties of the two different adjacent regions. In this specific example of transmitting and reflective regions 12 and 14, the interface region 16 is partially transmitting and partially reflective. Thus, the use of interface regions 16 provides continuous and smooth transition between the different optical properties, thereby providing gradual change of the optical property.

FIGS. 1B and 1C illustrate more specific examples of the implementation of the optical element 10, differing in the configuration of the interface regions 16. Regions 16 at the interface between adjacent regions of different optical properties are configured to provide substantially smooth transition between different optical properties affecting light components incident on the optical element 10. Considering the example where the optical element 10 includes reflecting regions 12 and transmitting regions 14, the interface region 16 is configured such that the transmittance decreases and reflectivity increases gradually along said interface 16 or vice versa. In the example of FIG. 1B, the transmission/reflection property varies gradually along the interface region, while in FIG. 1C a similar effect is implemented by using a sharp interface (e.g. Saw Tooth pattern) of a geometry selected to affect a light spot (cross-sectional dimension of a beam) of a certain physical size.

The optical elements 10 may be configured as a plate made of a substantially transparent material composition (e.g. glass), in which spaced-apart regions 12 are covered by reflective coating leaving transmitting regions 14 within the spaces between them. In the optical element of FIG. 1B, the density of the reflective coating varies gradually at the periphery of region 12 to provide smooth transition at the interface 16 with the transmitting region 14. In the optical element of FIG. 1C, the reflective coating at the periphery of region 12 has a certain well defined pattern, e.g. zigzag like defining a plurality of teeth, defining the interface region 16. Such pattern of the reflective property provides that the overall effect on a light spot of a finite physical size is substantially similar as the gradually varied density of the reflective coating. Thus, as exemplified in the figures, the interface 16 between transmitting and reflecting regions 14 and 12 provides substantially smooth transition between the effects of the adjacent regions.

Figure 2:
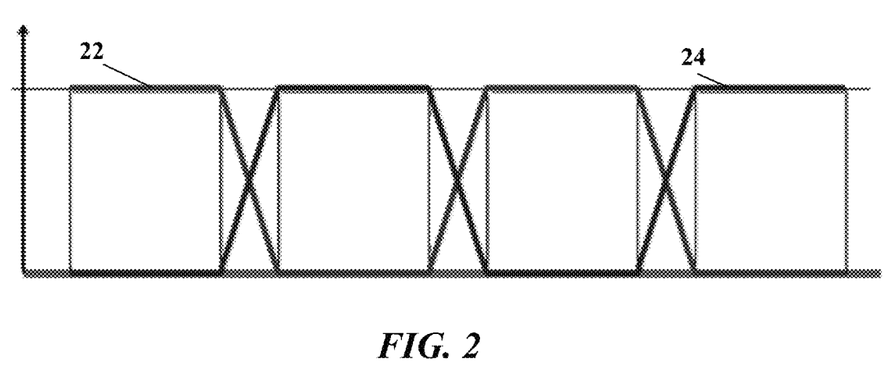
FIG. 2 illustrates effects of an optical element according to the present invention on intensity of light interacting with the optical element.

Reference is now made to FIG. 2 showing the intensity profiles 22 and 24 corresponding to light components reflected from and transmitted through the optical element of the present invention. As shown, the intensity profile of both light components is continuous. This is due to the provision of the interface regions 16; in the absence of such region the light profiles would be discontinuous. The intensity of light component 22 reflected from the optical element is substantially constant along the reflecting regions 12 and reduces gradually along the interface regions 16 to vanish when arriving to regions 14. Similarly, the intensity of light component 24 transmitted through the element is substantially constant along the transmitting regions 14 and reduces gradually along the interface regions 16 to vanish when arriving to regions 12.

Figure 3:
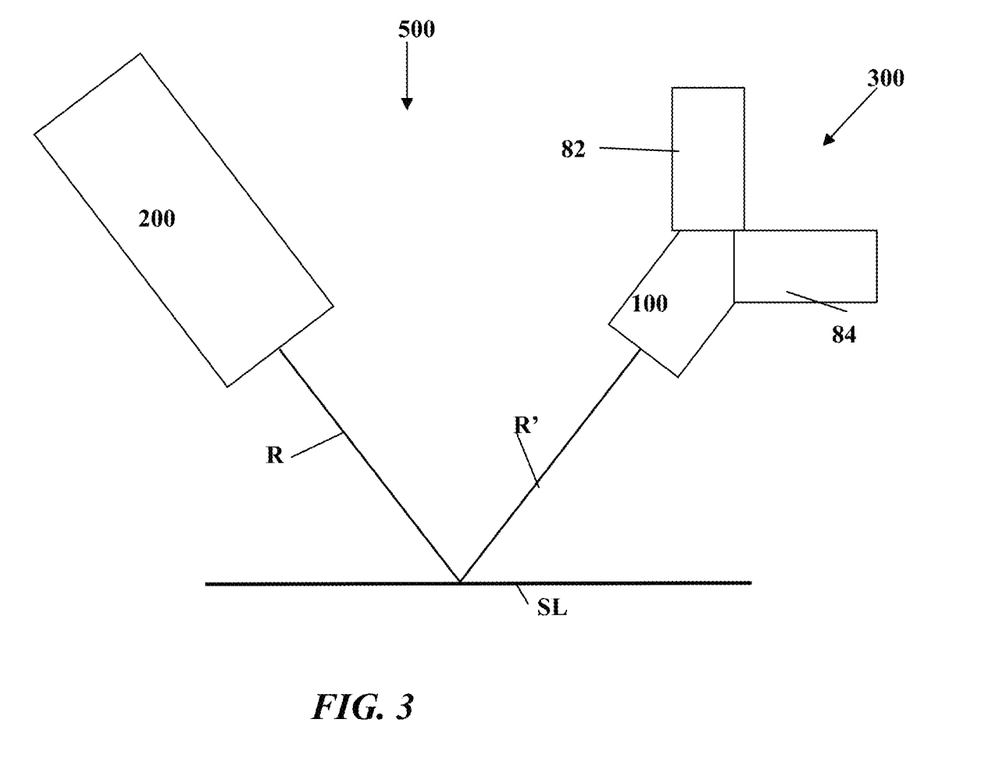
FIG. 3 illustrates a block diagram of a scanning imaging system utilizing an optical element according to an embodiment of the invention.

As indicated above, the optical element of the present invention is particularly useful in an imaging system utilizing two or more detection channels, which is typically useful in a scanning system. Reference is made to FIG. 3 illustrating in a way of a block diagram an optical imaging system 500 including an illumination unit 200 (typically including a light source system and possibly light guiding element(s)) for illuminating a sample; and a detection unit 300. The detection unit 300 includes a light collection unit 100 configured to collect light returned (scattered/reflected/transmitted) from the illuminated region/spot on the sample. In the present not limiting example, the reflection mode of the light collection is illustrated schematically. For example, the illumination channel/unit may be configured to scan a surface of the sample along a scan line SL by an illumination light spot. The light detection unit 300 defines at least two detection channels associated with respectively at least two detector units, each being in the form of an array of light sensitive regions. In the present example, two detector arrays 82 and 84 are shown defining two (generally, at least two) light sensitive surfaces located in different planes.

The light collection unit 100 includes the spatial beam shaping element 10 of the present invention and may also include other optical elements for light collection and imaging it onto the light sensitive surfaces of the detector units 82 and 84. The detector units are configured as sensor arrays, e.g. in order to avoid a need to move the detector along the scan line SL in accordance with the movement of the illumination spot.

Figure 4:
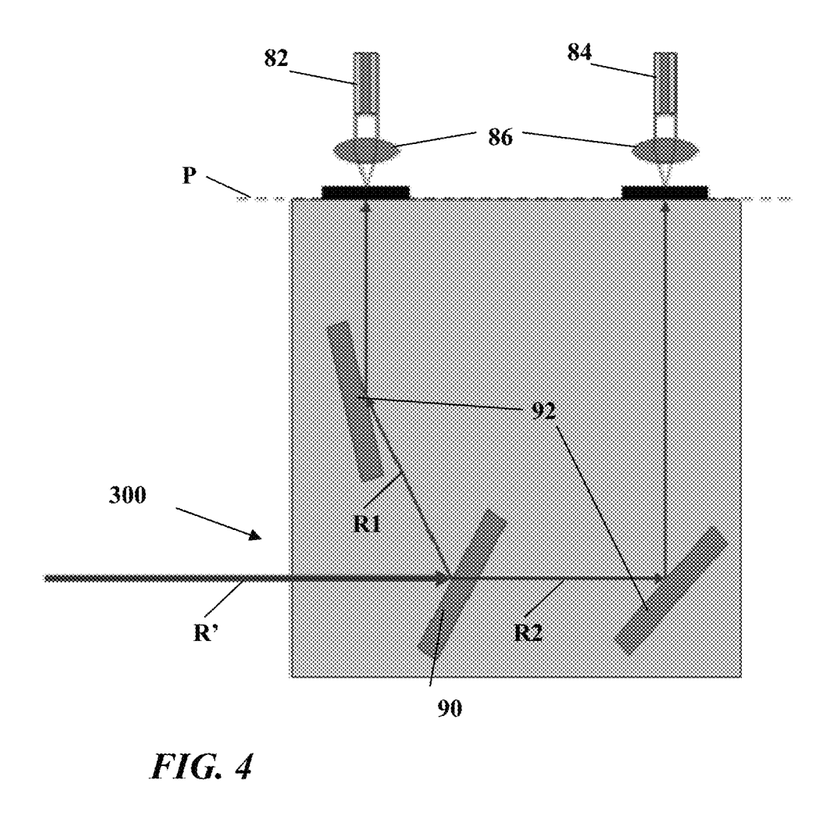
FIG. 4 exemplifies an optical imaging system in which the present invention can be used.

FIG. 4 illustrates a light propagation scheme in a similar light detection unit 300 configured according to the conventional techniques, i.e. without the optical element of the present invention. The detection unit 300 has two detector arrays of the optical detectors 82 and 84, and light directing optics. Light returned from the sample R' is incident on a conventional beam splitter 90 and is split into two spatially separated components R1 and R2, being reflected and transmitted components. These two light components R1 and R2 are directed towards light sensitive surfaces of the optical detectors 82 and 84 by optical assemblies 92, typically including mirrors (as shown in the figure). The detector units 82 and 84 (their light sensitive surfaces) may be located at the same or different image planes P, or at plane(s) conjugated therewith, in which case additional optical elements 86 (typically imaging lenses) may be utilized to direct the light to the detector units.

Considering for example a scanning imaging system operable to scan a sample utilizing a moving illumination spot scanning the surface of a sample while collecting light returned from the successive illumination spots on the surface. In order to reduce the number of moving elements and to increase the detection efficiency, an array of light detectors (e.g. photodiodes) can be used (typically a one-dimensional array). As described above, such configuration utilizing array of light detectors would suffer from blind/dead regions or lower resolution (loss of image data) due to the spaces (dead regions) between the detector elements within the array, such blind regions are originated from engineering and/or image processing constraints. This can be avoided by using two detector arrays 82 and 84 configured to be partially overlapping such that light sensitive region of one detector array 82 overlaps with a dead region between two light sensitive surfaces of the other detector array 84 to thereby provide a continuous detection along the scanning line. To this end, the beam splitter 90 is used to split collected light R' between the two detector arrays. However, such standard splitting results in that each detector array receives only up to 50% of the collected light intensity. In many optical applications, especially in scanning microscopes, the intensity of collected signal is limited (as a result of scattering from the sample) and therefore reducing it even more at the detection stage might reduce the signal to noise ratio (SNR) of detection and make it unpractical. Moreover, in some applications, the illumination intensity has to be limited, in order to avoid damages to the sample, which will also result in a weak detected signal.

Figure 5A:
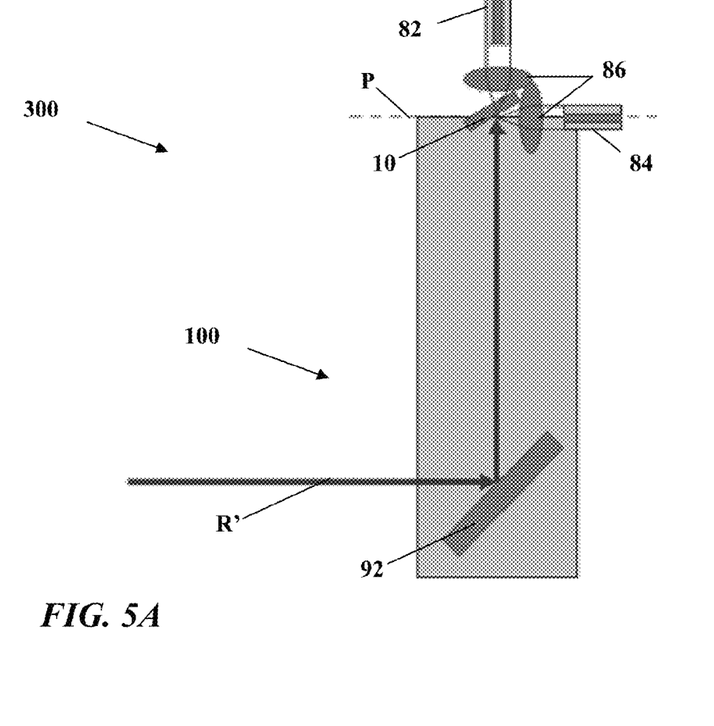
FIGS. 5A and 5B illustrate an example of a detection unit of a kind having two detector arrays and utilizing an optical element according to an embodiment of the present invention along with an operational detection scheme used in such detection unit.

The provision of the spatial beam shaper element 10 of the invention, configured as described above, in the light collection unit 100 associated with multiple detector arrays increases the efficiency of light collection while solving the problem of dead regions along the detector array. In this connection, reference is made to FIGS. 5A and 5B illustrating the configuration and operational scheme of a detection unit 300 utilizing the collection unit 100 with the optical element 10 of the present invention.

The collection unit 100 includes the spatial beam shaper 10 of the present invention located at an image plane P with respect to the sample being illuminated. In this example, the collection unit 100 includes a light directing element (e.g. mirror) 92 configured to direct the collected light R' to the predetermined image plane P, where the optical element 10 is located to divide the collected light between two detector units 82 and 84. The detector units 82 and 84 are in the form of detector array and are arranged such that active regions (light sensitive regions) of the detectors in one array cover (e.g. are aligned with) passive regions (dead regions) of the other detector array, thereby detecting together a continuous segment along a scanning line of the system. The optical element 10 is configured to direct one group of light components (e.g. reflected therefrom) to the active regions of one detector array and direct light components of another group (e.g. transmitted therethrough) to the active regions of the other detector array.

Figure 5B:
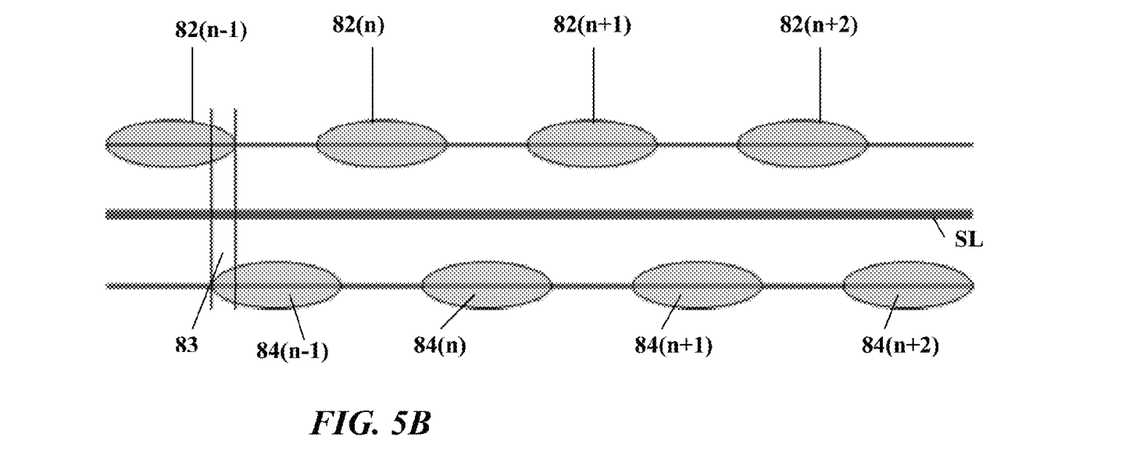

FIG. 5B exemplifies the arrangement of the detectors (active regions/light sensitive surfaces) in the two detector arrays for use in the system of the invention, where an overlapping arrangement of the active regions of the two detector arrays along an axis parallel to the scan line SL is provided. More specifically, the figure shows four spaced-apart active regions 82($n-1$), 82($n$), 82($n+1$) and 82($n+2$) of detector array 82 and four similar active regions 84($n-1$), 84($n$), 84($n+1$) and 84($n+2$) of detector array 84. As shown, the active regions of one detector are arranged in an interlaced fashion with respect to the active regions of another detector, along the scan line SL, and the corresponding active regions of the two detectors are partially overlapping along the scan line axis. It should be understood that the corresponding regions of the two detector arrays are adjacent regions when all the regions are projected on the common axis. By this, continuous detection of the illuminated region along the scan-line (SL) is provided. The overlap between the corresponding active regions of the detectors provides for reducing the border effects.

As described above, such arrangement of the active regions of two detector arrays, however, would suffer from no more than 50% intensity at each detector array if used with a conventional beam splitter. To this end, the invention utilizes the spatial beam shaper 10 configured as described above (namely having an interface region of multiple optical properties between the two regions each having one of these optical properties) where the interface region has geometry and size corresponding to those of the overlap region between the corresponding active regions of the detector arrays. In other words, the interface region (16 in FIGS. 1A-1C) of the optical element 10 and the overlap region 83 in the detector unit are preferably configured to be an image of one another. This configuration provides that when a point/spot on the sample is illuminated and is being imaged via the optical element 10 onto the active region of one detector, the full intensity of the collected light reaches said detector. When the illuminated spot is located at a point on the sample whose image/projection corresponds to the overlap region 83 of the detector unit, the light being detected is that collected by the interface region(s) 16 of the optical element 10, which due to both of the optical properties therein directs the collected light towards both detector arrays. Accordingly, the intensity of light detected by any of the detectors within the overlap regions 83 varies along the overlap region, while the intensity detected by both detectors within said overlap region corresponds to the total collected intensity.

It should be noted that the pattern of the optical property variation along the interface region might be selected in accordance with the collection Point Spread Function (PSF) and/or the collection pixel size, of the optical system, i.e. the pattern feature has a dimension smaller than the projection of illuminated spot onto the optical element. More specifically, turning back for example to FIG. 1C, the spatial frequency of the Saw Tooth pattern or the distance between the teeth might be selected to be of the order of or smaller than the projection of the illuminated spot onto said pattern (which is actually the collected light propagated through the collection optical channel until it reaches to the optical element).

It should further be noted that the above configuration of the detection unit 300 as exemplified in FIGS. 5A-5B enables independent calibration of each active region of the detector array, as well as independent processing of the output thereof. In this connection, it should be understood that different light sensitive surfaces 82(*n*), e.g. pixels, are typically non equal is their response to optical signal. In order to provide accurate detection, output data of each of the light sensitive regions of the detector arrays should preferably be processed independently. The use of the spatial beam shaper 10 of the present invention in the collection channel of the detection unit actually provides for generating virtual detection elements composed of the non overlapping region (the region upon the sample in which all the collected light is being detected by only one detector) along with the overlapping regions (the region upon the sample in which all the collected light is being detected by two adjacent detectors simultaneously). It should further be noted that adjacent virtual detectors may or may not be physically adjacent in the detection path.

Figure 6:
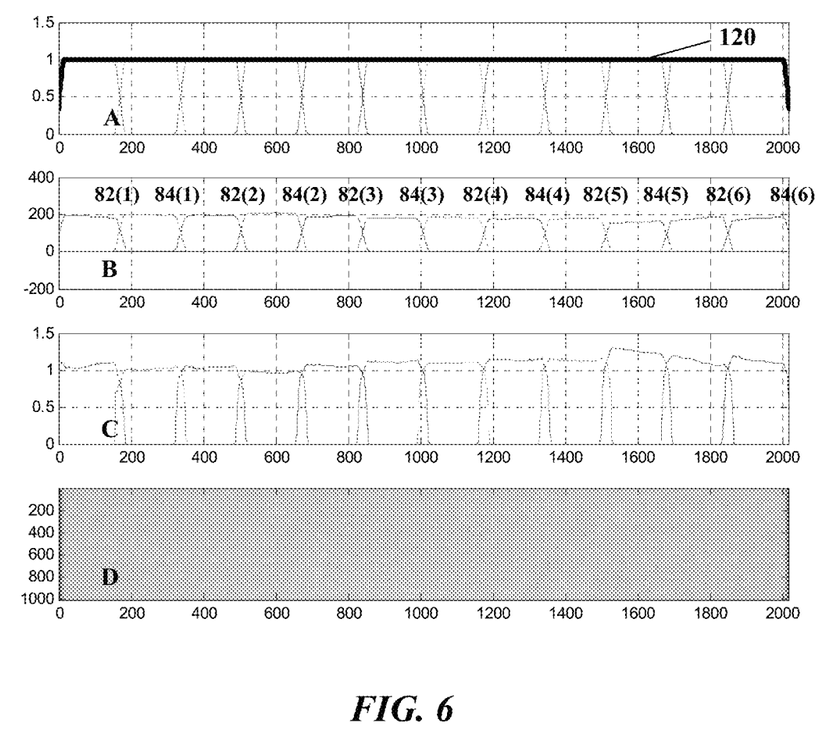
FIG. 6 exemplifies a suitable calibration technique for calibrating the detection unit utilizing the optical element according to the present invention.

Reference is now made to FIG. 6 exemplifying some aspects relating to a calibration technique for calibration of two detector arrays in the detector unit utilizing the optical element of the present invention. It should be noted that ideal detectors would provide similar response to similar signal, as shown e.g. in FIG. 2. However actual detectors typically vary in their response function and thus the output signals thereof is generally not identical. A proper calibration process, as described herein below, provides a baseline for differentiating between variation of the output value and the corresponding indication with the input signal to be measured. The figure shows four graphs A-D, where graph A corresponds to the cross section of the target response (desired output) of both detector arrays to a uniform input optical signal 120 of a predetermined intensity along a longitudinal axis relative to the scan line; graph B shows the cross section of the output signals generated by different active regions 82(1) to 82(6) and 84(1) to 84(6) of the detector arrays in response to the uniform input optical signal 120; graph C shows a plot of the relative gain factors calculated for each active regions of the detector arrays in order to obtain the desired output response (i.e. signal 120 depicted in Graph A); and graph D shows a desired output image after gain factors multiplication of the individual output signals from different active regions. In the figure, all vertical axes are described in arbitrary units while the horizontal axis refers to scan location on a sample (i.e. longitudinal X axis). As shown in graph A, the desired response of the detector arrays is typically uniform with respect to the exact position of the input optical signal, i.e. the scan location on the sample, and with respect to the individual light sensitive regions of the detectors. In order to achieve such a response, the calibration technique involves a control optical input signal (i.e. sample input) and utilizes processing of the detectors' output data (calibration signal) corresponding to the control input signal as measured by the different light sensitive regions along the scan line. An example of such calibration signal is shown in graph B for different light sensitive regions of the detector arrays 82(1) to 82(6) and 84(1) to 84(6). As can be seen in the graph, the response of each of the virtual detectors has a trapezoid shape relative to the scan location (input location) while having various deviations from the desired response of graph A. The trapezoid shape response of the light sensitive regions is causes by the provision of the spatial beams shaper in the light collection channel providing smooth transition between the corresponding regions of the detector arrays. For example, the first region of the optical element (along the scan line) directs light (e.g. reflects the light incident thereon) to light sensitive region 82(1) of detector array 82 and the second region of the optical element directs light (e.g. transmits light incident thereon) to light sensitive region 84(1) of detector array 84 while the transition between the two regions is continuous with regard to the light intensity profile.

The calibration technique involves calculation of gain factors for calibrating the "raw" output signals of the detector array. Graph C shows a plot of such gain factors relative to different locations along the scan line, being calculated in accordance with the measured response of graph B and the desired response shown in graph A. The gain factors are calculated for each light sensitive region separately and correspond to different locations along the scan line, to thereby enable accurate detection regardless of small variations between the responses of the light sensitive regions. It should be noted that due to the use of the spatial beam shaper as described above, for any point along the scan line substantially all the intensity of the collected light reaches the detector units and can be measured. Graph D illustrates a desired homogenous image generated by the detection unit 300 after being processed using the above described calibration technique. This graph shows very small variation in responses of the different light sensitive regions of the detector arrays.

Thus, the present invention provides a novel optical element configured to provide smooth transition between at least two optical properties, and an optical detection system configured to eliminate, or at least significantly reduce, dead regions of the detection channel. Those skilled in the art will readily appreciate that various modifications and changes can be applied to the embodiments of the invention as hereinbefore described without departing from its scope defined in and by the appended claims.

What is claimed is:

1. An optical detection unit for use in an imaging system, the optical detection unit comprising two detector arrays each in the form of an array of spaced-apart light sensitive regions; and a spatial beam shaper structure accommodated in an optical path of light propagating towards the detector arrays, wherein the detector arrays are arranged such that light sensitive regions of one detector array are aligned with spaces between the light sensitive regions of the other detector array with certain overlap regions between corresponding light sensitive regions of the two detector arrays, the spatial beam shaper structure comprises a light collecting surface having a pattern in the form of multiple surface regions comprising regions of at least two different optical properties arranged in an alternating fashion and is configured for affecting light impinging thereon to provide a substantially smooth light profile of at least one optical property, and an interface region between each two locally adjacent regions of the different optical properties having said at least two different optical properties to provide substantially smooth transition of said different optical properties within the interface region; and said spatial beam shaper is configured for directing first light components, collected by the regions of one optical property, to the light sensitive regions of one detector array, and directing second light components, collected by the regions of the other optical property, to the light sensitive regions of the other detector array, said interface region being configured as an image of the overlap region in the detector arrays.

2. The optical detection unit of claim 1 wherein said regions of different optical properties are characterized by different transmission of light of a certain wavelength range.

3. The optical detection unit of claim 1 wherein said regions of different optical properties are substantially reflecting and transmitting regions for a certain wavelength range.

4. The optical detection unit of claim 1 wherein said interface region is patterned to provide smooth transition of the at least one optical property.

5. The optical detection unit of claim 4 wherein said pattern of said spatial beam shaper is configured to define a zigzag-like transition line between the regions of different optical properties.

6. The optical detection unit of claim 1 wherein said transition defines a transition gradient between the different optical properties.

7. The optical detection unit of claim 1 wherein a feature of said pattern within the interface region has predetermined geometry and shape selected in accordance with a parameter of a light sensitive surface of the detection unit.

8. The optical detection unit of claim 1 wherein the pattern on the light collecting surface is in the form of multiple spaced-apart regions of one optical property printed on said surface having the other optical property.

9. A method for use in detection of light, the method comprising detecting light by discrete spaced-apart detection regions, the method being characterized by minimizing energy losses due to the spaces between the detection regions, the method comprising: applying spatial splitting of light to be detected into first and second light portions, said splitting comprising interacting the light to be detected with a pattern of alternating regions of different transmission and reflection properties for transmitting spaced-apart light components of the first light portion towards a first array of said spaced-apart detection regions and reflecting spaced-apart light components of the second light portion towards the second array of said spaced-apart detection regions, while providing gradual variation of the transmission and reflection properties within an interface region between locally adjacent regions of the different transmission and reflection properties.

10. The method of claim 9 wherein said providing gradual variation comprises patterning said interface region to provide smooth transition of the at least one optical property, and wherein said transition defines a transition gradient between the different optical properties.

11. The method of claim 10 wherein said patterning comprises configuring a feature of said pattern with predetermined geometry and shape selected in accordance with a parameter of at least one of said first array of said spaced-apart detection regions and second array of said spaced-apart detection regions.

12. The method of claim 10 wherein said patterning comprises printing multiple spaced-apart regions of reflection properties on a surface having transmission properties.

* * * * *